Sept. 11, 1928.  
J. L. PERKINS ET AL  
1,684,141
FEED MECHANISM
Filed June 11, 1927
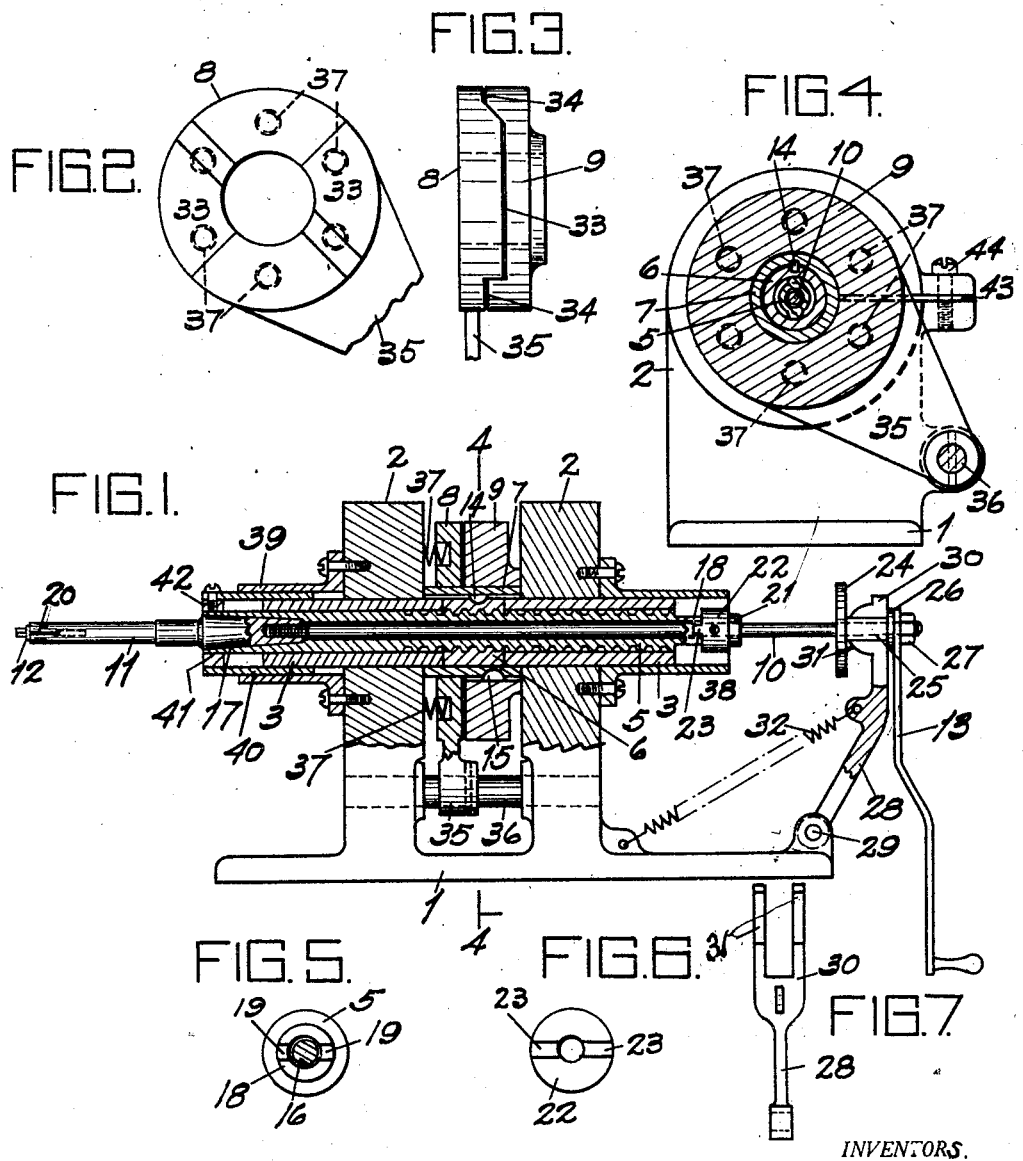
INVENTORS.  
Julian L. Perkins,  
BY Hiram L. Croft,  
Frank A. Cutter,  
ATTORNEY.

Patented Sept. 11, 1928.

1,684,141

UNITED STATES PATENT OFFICE.

JULIAN L. PERKINS, OF WEST SPRINGFIELD, AND HIRAM D. CROFT, OF SPRINGFIELD, MASSACHUSETTS, ASSIGNORS TO PERKINS MACHINE AND GEAR COMPANY, OF SPRINGFIELD, MASSACHUSETTS, A CORPORATION OF MASSACHUSETTS.

FEED MECHANISM.

Application filed June 11, 1927. Serial No. 198,186.

Our invention relates to improvements in feed mechanism for use in connection with metal-cutting machines, and consists generally of a threaded member operating through a nut, and provided with work-holding or work-carrying means, means for rotating said member, certain peculiar, indexing elements mounted on said nut, and a yielding, lost-motion device at the outer end of said rotating means, together with such other parts and members as may be necessary or desirable in order to render the mechanism complete and serviceable in every respect, all as hereinafter set forth.

The primary object of our invention is to provide mechanism, which both structurally and functionally is comparatively simple, for feeding an object while having threads formed thereon or therein by a cutting or forming tool or implement, and for controlling the motion of such object while being acted on by said tool or implement, or during the thread-forming operation.

Another object is to insure the accuracy of the threads cut or otherwise formed in machines adapted for the purpose. After worms, and other objects having internal or external threads, are primarily cut or formed, such objects are hardened, and in the hardening process the threads are liable to become more or less distorted, but by feeding the object through the metal-cutting machine again, with this mechanism, the threads are restored to a degree of accuracy that heretofore has not always been feasible to obtain. This mechanism is used, of course, during the initial cutting or forming of the threads, as well as when the objects after being hardened are run through the metal-cutting machine a second time.

A further object is to afford means in the feeding mechanism to prevent lost-motion on the part of the feeding elements, and thereby to insure a steady and uniform action of said elements.

The feeding mechanism may be constructed as an attachment for a metal-cutting machine, or may be incorporated with such a machine as an original and fixed element thereof.

Other objects and advantages will appear in the course of the following description.

We attain the objects and secure the advantages of our invention by the mechanism illustrated in the accompanying drawings, in which—

Figure 1 is a central, longitudinal, vertical section, with parts in elevation, through feed mechanism which embodies a practical form of our invention; Fig. 2, an inner side elevation of one of the indexing members or sections; Fig. 3, a front elevation of both of said indexing members or sections; Fig. 4, a transverse, vertical section through said feed mechanism, taken on lines 4—4, looking in the direction of the associated arrow, in Fig. 1; Fig. 5, an enlarged elevation of the right-hand end of the feed screw; Fig. 6, an enlarged inner end elevation of the collar which engages said screw, and, Fig. 7, an inner side elevation of the lost-motion arm.

Similar reference characters designate similar parts throughout the several views.

In the present example, the frame of this feed mechanism comprises a base 1 and two transverse uprights 2 rising therefrom. The uprights 2 are spaced apart, and have aligning openings therein for bushings 3—3, said bushings extended lengthwise of said base. A feed screw 5 is journaled in the bushings 3, and passes through a nut 6. A sleeve 7 is mounted on the nut 6, and index sections 8 and 9 are mounted on said sleeve. An actuating spindle 10 extends through the screw 5, and a work spindle 11 is connected with said actuating spindle and held thereby in engagement with said screw. Means, such as a spreader 12, for securing the work to the spindle 11, and a crank-arm 13 for operating the actuating spindle 10, also are provided.

The bushings 3 extend at their outer ends beyond the uprights 2, and at their inner ends into the space between said uprights, and the nut 6 is mounted on the screw 5 between the inner ends of said bushings, and thereby held against endwise movement. The sleeve 7 is keyed at 14 to the nut 6, and the index section 9 is keyed at 15 to said sleeve, said index section and the index section 8 being between the uprights 2, with said first-named section adjacent to the right-hand upright.

The feed screw 5 has a central bore 16 therethrough for the spindle 10, and said bore is enlarged at the left-hand terminal to form a chamber the sides of which flare from within outwardly to receive the inner terminal of the spindle 11, which inner terminal is conical, as represented at 17 in Fig. 1. The right-hand or rear terminal of the screw 5 is reduced in diameter, as represented at 18, and in the outer end of this reduced part are lateral aligning slots 19—19 which extend outwardly from the bore 16 to the periphery. The threads on the screw 5 extend from the vicinity of the part or head 18 to the left for about three-fifths of the length of said screw.

The outer terminal of the spindle 11 is split, as shown at 20, and the spreader 12, which is of ordinary construction, fits into this split terminal, and is adapted to expand the same against the work when in place on said spindle, all in the usual and well-known manner.

The left-hand, inner terminal of the spindle 10 is externally screw-threaded and tapped into the contiguous terminal of the spindle 11. Mounted on and secured to the spindle 10, between the feed-screw head 18 and a flange 21 on said spindle, is a coupling collar 22, which is provided on its inner side with two aligning transverse, ribs 23—23 that are adapted to enter the slots 19 in said head. Thus the spindle 10 and the screw 5 are rotatably connected. Before the collar 22 is secured to the actuating spindle 10, said spindle is rotated in the direction to draw the conical part 17 of the work spindle 11 into close engagement with the chambered part of said screw, through the medium of the interengaging screw-threaded parts. This frictional engagement between the parts is sufficient to cause the work spindle to rotate and move longitudinally with the feed screw.

A disc 24 having a hub 25 is mounted on the spindle 10 adjacent to the right-hand or rear end of the same, and at the right of said hub the hub of the crank-arm 13 is mounted on said spindle, a washer 26 being interposed between said hubs. A nut 27 is threaded onto the extreme rear end of the spindle 10 and set up against the crank-arm hub to bind the same in place on said spindle.

Upon turning the crank-arm 13, in either direction, a rotary motion in the same direction is imparted to the spindle 10, the screw 5, the spindle 11, and the object or work (not shown) in said last-named spindle.

An arm 28 has its lower end pivotally connected at 29 with a lug on the right-hand end of the base 1, extends upwardly, and terminates in a bifurcated head 30 having on the inner edges thereof semi-circular lugs 31—31. The lugs 31 bear on the outer side of the disc 24, and are held in contact with said disc by means of a spring 32, which has one end connected with the base 1 and the other end connected with the arm 28. The spring 32 acts on the arm 28 to swing the same to the left and exert a constant pressure with the lugs 31 on the disc 24, whereby lost motion on the part of the spindle 10 is prevented, and a brake is provided for said spindle which stabilizes the rotation thereof and of the parts and members actuated thereby.

The index section 8 is provided with teeth 33, and the index section 9 is provided with teeth 34, and these teeth on the two sections are adapted to intermesh with each other, but have tapered sides which enable them to be disengaged when one section is held stationary and the other section is rotated. The section 8 is loosely mounted on the sleeve 7, between adjacent sides of the left-hand upright 2 and the section 9, and said first-named section is provided with a tail-piece 35 having at the lower, rear end a hub mounted to slide in the direction of its axis on a horizontal rod 36 set in lugs on the rear edges of the uprights 2. Six, more or less, horizontal springs 37 have their left-hand ends pocketed in the left-hand upright 2 and their right-hand ends pocketed in the index section 8, and said springs have a constant tendency to force said section toward the section 9, and normally retain the teeth 33 and 34 in engagement with each other.

A hollow, cylindrical dust guard 38 is attached to the outer side of the right-hand upright 2, and extends outwardly over and around the collar 22. A similar dust guard 39 is fastened to the outer side of the left-hand upright 2, and this dust guard is supplemented by a hollow, cylindrical, telescoping dust guard 40 which has at the outer end an interior flange 41 that fits the feed screw 5 and said telescoping guard is secured, by means of a radial screw 42, to said screw. The purpose of these guards is to prevent dust and dirt from entering between the bushings 3 and the screw 5. The dust guard 40 moves forwardly and rearwardly with the screw 5, sliding on the left-hand bushing 3 and between the same and the dust guard 39.

Each upright 2 is split on the back side, as shown at 43 in Fig. 4, and provided with a bolt 44 to draw the split parts together and bind securely in place the bushings 3 carried by said upright.

The threads on the feed screw 5 have a linear lead or advance per revolution which is equal to, and is of the same hand, as the threads to be formed on the work. Otherwise the feed screw need not correspond with the work.

The operation of the feed mechanism as a whole is described as follows:

Assuming that the parts are disposed as in Fig. 1, and an object on which threads are to be cut is secured in place on the outer end of the work spindle 11, the crank-arm 13 is turned to the right and carries with it the actuating spindle 10 which in turn rotates the feed screw 5 in the same direction, through the medium of the collar 22 and the ribs 23 which engage said screw. This rotation of the screw 5 causes said screw to advance, owing to the engagement of the same with the nut 6, with the result that the spindle 11 and the work thereon are simultaneously revolved and moved forward, and said work is moved into and in contact with the thread-cutting or -forming tool or implement of the metal-cutting machine with which the feed mechanism is associated. After the actuating spindle 10 has been rotated a sufficient number of times to advance the work spindle 11 far enough to carry the work past the forming tool, said actuating spindle is reversed, by reversing the direction of movement of the crank-arm 13, and rotated until the work has been withdrawn to initial position. Then the feeding operation is repeated one or more times if and as required.

In the event it be desired to index the work, by partially rotating the same, after it has been acted on by the thread-forming tool, to present a different part of the work initially to said tool, when next said work is advanced, the spindle 10 is rotated in the reverse direction, and with said rod the screw 5, a sufficient number of revolutions, or to a sufficient extent, to move the unthreaded part of said screw at the left of the threads thereon into contact with the corresponding end of the nut 6. The rotation of the spindle 10 and the screw 5 in the reverse direction is continued, and said screw causes the nut 6 to be rotated with it. The nut 6 in rotating carries with it the sleeve 7, and the latter carries with it the index section 9, because then the teeth 34 ride over the teeth 33 and force the index section 8 to the left, against the resiliency of the springs 37. The section 8 is held against rotation by the tail-piece 35 and the rod 36, but at this time said tail-piece slides to the left on said rod. As soon as the teeth 34 ride off of the teeth 33, the section 8 is actuated by the springs 37 to the right again, the tail-piece 35 then sliding in the same direction on the rod 36, and said teeth 33 come into full engagement once more with said teeth 34. The section 9 is now held against rotation by the section 8, as before. At the end of the indexing operation the rotation of the spindle 10 in the reverse direction is discontinued, and said spindle is rotated to the right to carry the work a second time into contact with the forming tool. Then the parts are reversed and retracted, and the indexing, and the thread-forming operations are repeated, if necessary, and as often as necessary.

When finally the work is finished, which may be after being subjected to the action of the forming tool one or more times, and either with or without being indexed one or more times, said work is removed from the spindle 11.

As long as the screw 5 is operated without engaging the nut 6 with the unthreaded part of said screw, the index remains locked and holds said nut against rotation, the frictional resistance between the index teeth being greater than that between the threads of the screw and the nut when the former is rotated.

As the disc 24 advances with the spindle 10, the arm 28 rocks to the left on the pivot 29 following the disc and, as said disc is retracted with said spindle, said arm is rocked to the right, always being under tension from the spring 32, and in position to hold the rotating and reciprocating members against lost motion.

Work of different sizes and kinds or types require work spindles that at their outer ends are capable of receiving and holding such work.

More or less change in the shape, size, construction, and arrangement of some or all of the parts of this feed mechanism, in addition to those hereinbefore pointed out or referred to, may be made, without departing from the spirit of our invention, or exceeding the scope of what is claimed.

What we claim as our invention, and desire to secure by Letters Patent, is—

1. In feed mechanism of the class described, a rotary member provided with work-carrying means, means to cause said member to move longitudinally when rotated, and yielding means to apply pressure to said member in the direction of its axis without preventing the rotation of the member whenever sufficient force is applied thereto.

2. In feed mechanism of the class described, work-carrying means, means to cause said first-named means when revolved to be reciprocated, but adapted to check the endwise movement of said first-named means, when the latter is rotated in one direction until contact is made between said first- and second-named means, said first-named means having a part to engage said second-named means, after the former has been rotated in one direction a predetermined amount, whereby further endwise movement is prevented, and means automatically to release said second-named means, when the aforesaid engagement takes place, permit the same to be rotated with said first-named means a predetermined distance in said direction, and relock said second-named means.

3. In feed mechanism of the class described, a rotary member provided with work-carrying means, means to cause said member to move longitudinally when rotated, and means normally to hold said second-named means stationary, but adapted to yield under force exerted by said member when rotated in one direction only, and permit said second-named means to be rotated a predetermined amount.

4. In feed mechanism of the class described, a screw-threaded rotary member provided with work-carrying means, non-reciprocating means to cause said member to move longitudinally when rotated, and means normally to hold said second-named means against rotation, but adapted to yield and permit said second-named means to rotate with said member, when an unthreaded part of said member encounters said second-named means.

5. In feed mechanism of the class described, a non-reciprocating screw-threaded member, a rotary screw-threaded member passing through in engagement with said first-named member, and provided with work-carrying means, means to rotate said second-named member, and tooth-provided normally intermeshing index sections, one of said sections being revolubly connected with said first-named member, and the other of said sections being held against rotation and spring pressed toward said first, and said first-named member having a part to engage said second-named member and cause the same to rotate and carry with it said connected section, against the force of said spring-pressed section.

6. In feed mechanism of the class described, a normally stationary screw-threaded member, a rotary screw-threaded member passing through in engagement with said first-named member, and provided with work-carrying means, means to rotate said second-named member, and yielding means to prevent lost motion on the part of the rotary members, without preventing rotation of the same under sufficient force to overcome the frictional resistance.

7. In feed mechanism of the class described, a normally stationary screw-threaded member, a rotary screw-threaded member passing through in engagement with said first-named member, and having a longitudinal passage therethrough, a work spindle and an actuating spindle in said passage and in engagement with each other, whereby said work spindle is secured to said second-named member, and means to couple said actuating spindle to said second-named member.

8. In feed mechanism of the class described, a normally stationary nut, a screw passing through said nut and having a central passage therethrough, an actuating spindle in said passage, and provided with a collar, adjacent ends of said screw and said collar having engaging parts, and a work spindle attached to said screw.

9. In feed mechanism of the class described, bearing members spaced apart, bushings secured in said members, said bushings being spaced apart at their inner ends, a screw journaled in said bushings, and provided with work-carrying means, a nut mounted on said screw between said bushings, means normally to hold said nut against rotation, and means to rotate said screw.

10. In feed mechanism of the class described, bearing members spaced apart, bushings secured in said members, said bushings being spaced apart at their inner ends, a screw journaled in said bushings, a nut mounted on said screw between said bushings, a work spindle secured to said screw at one terminal thereof, an actuating spindle in said screw and extending beyond the same at the opposite terminal, coupling means between said actuating spindle and said screw, and a hollow dust guard extending outwardly from one of said bearing members far enough to inclose said coupling means.

11. In feed mechanism of the class described, bearing members spaced apart, bushings secured in said members, said bushings being spaced apart at their inner ends, a screw journaled in said bushings, a nut mounted on said screw between said bushings, a work spindle secured to said screw at one terminal thereof, an actuating spindle in said screw and extending beyond the same at the opposite terminal, coupling means between said actuating spindle and said screw, a hollow dust guard extending outwardly from one of said bearing members and having the same axis as that of said screw, and a hollow dust guard secured to said screw and telescoping into said first-named dust guard.

12. In feed mechanism of the class described, a suitably journaled screw provided at one terminal with work-carrying means, an actuating spindle projecting beyond the other terminal of said screw, a normally stationary nut mounted on said screw, and yielding means adapted at all times frictionally to engage and to exert a constant endwise pressure on said actuating spindle.

13. In feed mechanism of the class described, a suitably journaled screw provided at one terminal with work-carrying means, a spindle projecting beyond the other terminal of said screw, and adapted when revolved to actuate the same, a normally stationary nut mounted on said screw, a disc secured to said spindle, a pivotally mounted arm having lugs to bear against said disc, and a spring arranged to force said arm toward said disc.

14. In feed mechanism of the class described, bearing members spaced apart, a rod between said members, bushings secured in said members, and spaced apart at their inner terminals, a screw journaled in said bushings, and provided at one terminal with work-carrying means, a nut mounted on said screw between said bushings, means to rotate said screw, a sleeve mounted on said nut and bushings, and secured to said nut, index sections, provided with normally intermeshing teeth, mounted on said sleeve, one of said sections being secured to said sleeve, and the latter being loose in the other of said sections, which last-named section has a tail-piece slidingly arranged on said rod, to hold the second section against rotation, and springs arranged to force said second section toward said first section, the construction and arrangement of parts being such that, when an unthreaded part of said screw encounters said nut, the latter is caused to rotate and carry with it said sleeve and the index section secured thereto, thereby forcing the other index section outwardly, against the resiliency of its springs, while said first section moves the distance between two of its teeth, when said second section moved toward the first, and the teeth on the two sections again intermesh, said tail-piece sliding on said rod.

15. In feed mechanism of the class described, a non-reciprocating threaded member, a revoluble and reciprocating threaded feed member in engagement with said first-named member, and means normally to hold said first-named member against rotation, the frictional resistance between said means and said first-named member being greater than that between the screw-threaded parts when said feed member is rotated, but capable of being overcome when an unthreaded part of said feed member in revolving encounters said first-named member.

JULIAN L. PERKINS.
HIRAM D. CROFT.